United States Patent [19]
Stumpf et al.

[11] 3,907,339
[45] Sept. 23, 1975

[54] CRYOGENIC DELIVERY LINE

[75] Inventors: Joseph G. Stumpf, Fairfield; Joseph F. Andera, Trumbull, both of Conn.

[73] Assignee: Frigitronics of Conn., Inc., Shelton, Conn.

[22] Filed: July 23, 1973

[21] Appl. No.: 382,009

[52] U.S. Cl. ............ 285/149; 128/303.1; 138/138; 285/244; 285/DIG. 5
[51] Int. Cl. ...................... F16l 39/02; F16l 59/14
[58] Field of Search ........ 285/244, 149, DIG. 5, 47, 285/55, 318, 114; 138/138, 129, 130; 128/303.1

[56] References Cited
UNITED STATES PATENTS

| | | | |
|---|---|---|---|
| 2,234,350 | 3/1941 | Muller | 285/149 |
| 2,470,599 | 5/1949 | Billmeyer | 138/130 X |
| 2,787,289 | 4/1957 | Press | 285/149 X |
| 2,854,030 | 9/1958 | Schulthess | 138/138 X |
| 3,004,779 | 10/1961 | Cullen et al. | 285/149 |
| 3,240,234 | 3/1966 | Bond et al. | 138/138 X |
| 3,566,002 | 2/1971 | Brown | 138/138 X |
| 3,690,704 | 9/1972 | Reynolds et al. | 285/244 |
| 3,706,208 | 12/1972 | Kadi et al. | 285/DIG. 5 |

*Primary Examiner*—Thomas F. Callaghan
*Attorney, Agent, or Firm*—Buckles and Bramblett

[57] ABSTRACT

A cryogenic delivery line for delivering a cryogenic fluid from a container to a cryosurgical instrument. It comprises an inner plastic tubing wrapped with a suitable flexible insulating material and covered by a protective fiber glass sheath. Crimping near the ends of the line is avoided by a construction which utilizes a pair of concentric spiral springs, one between the fiber glass sheath and the insulated plastic tube and the other over the outside of the sheath and having a shorter length than the inner spring.

10 Claims, 2 Drawing Figures

US Patent  Sept. 23, 1975  3,907,339
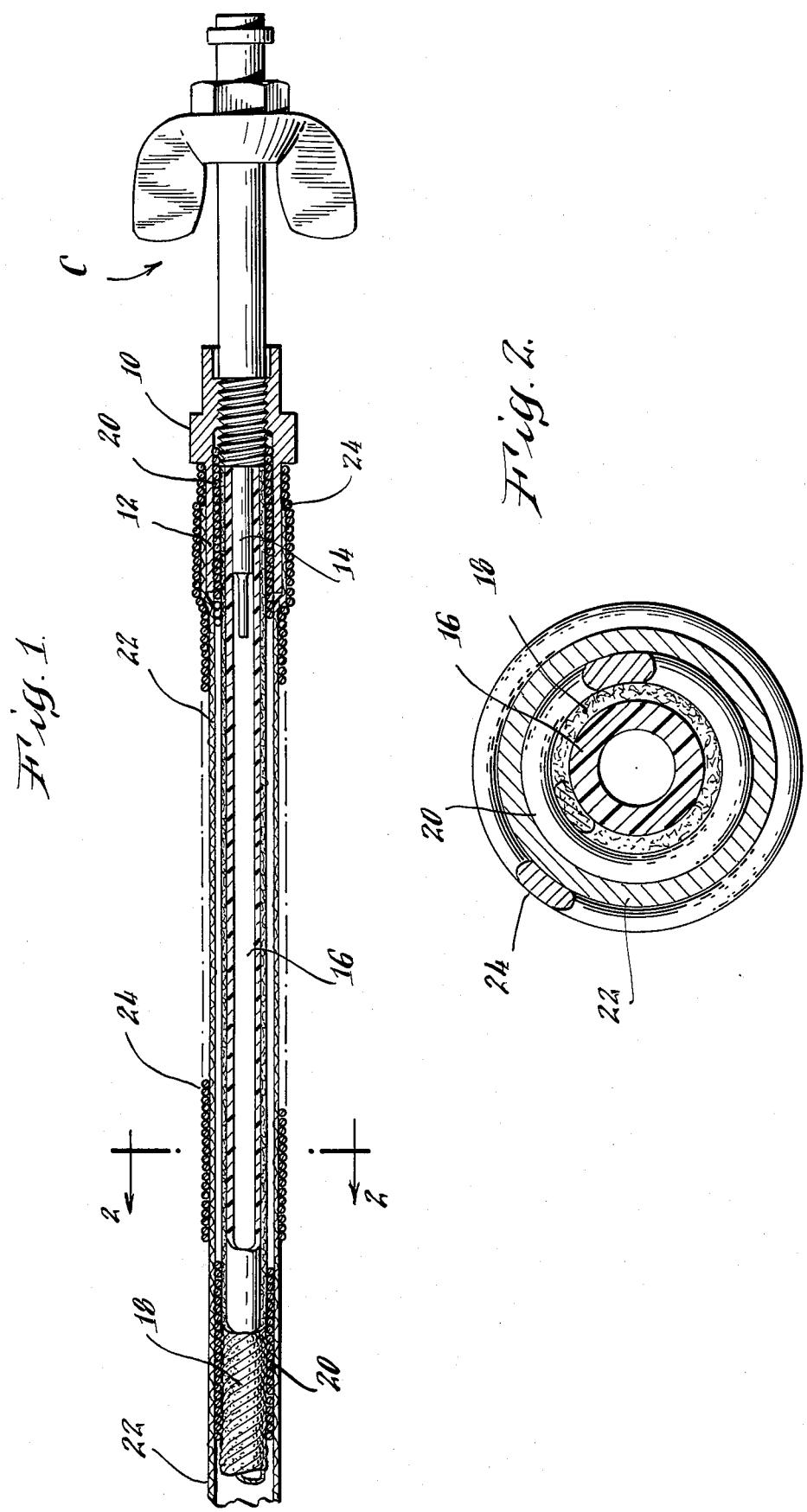

CRYOGENIC DELIVERY LINE

BACKGROUND OF THE INVENTION

One type of instrument which is widely used in cryosurgery utilizes liquid nitrogen. Such instruments are used primarily in dermatology and also for treating some tumors. The liquid nitrogen is contained in a relatively large insulated flask and is transported to the cryosurgical instrument through a delivery line which terminates in a phenolic handle which carries the cryosurgical probe. A well known delivery line in accordance with the prior art comprises a central stainless steel tube which is insulated with wool yarn and is enclosed with a stainless steel bellows tube to provide flexibility. Such delivery lines present a number of problems. For example, they are quite expensive to make as the bellows tubing alone may cost approximately $6.00 per foot. Secondly, sharp bends are apt to crimp and break the inner line which, it will be understood, is at cryogenic temperatures. Such bends are particularly apt to occur near the cryogenic flask as a result of sideward pulls by the surgeon. Thirdly, the entire unit, consisting of the cryosurgical instrument and the delivery line, is unitary and welded. Accordingly, if a break occurs the entire unit is lost. Finally, but quite important, the delivery line lacks the requisite flexibility and is difficult for the surgeon to maneuver.

Accordingly is the primary object of the present invention to provide an inexpensive cryosurgical delivery line. Other objects are to provide such a line which is flexible; which is resistant to sharp bends and crimping; and which is easy to maneuver. The manner in which the foregoing objects are achieved will be apparent from the following description and appended claims.

SUMMARY OF THE INVENTION

A cryogenic delivery line having a tubular metal connector secured to one end thereof. The line comprises a plastic tube which is connectable to a source of cryogenic fluid and a flexible insulating material covering the tube. A spiral first spring encircles the tube and insulating material and extends from the end thereof for a first distance therealong. The tube, insulating material, and first spring are all contained at the end within the tubular metal connector. A flexible tubular sheath encloses the insulated plastic tube, the first spring, and the tubular metal connector. A second spiral spring encircles the sheath and connector and extends from the end of the line and along the sheath for a second distance different from that of the first spring.

BRIEF DESCRIPTION OF THE DRAWING

FIG. 1 is a cross-sectional elevational view illustrating the construction of a cryogenic delivery line in accordance with the present invention; and FIG. 2 is an enlarged cross-section taken substantially along the line 2—2 of FIG. 1.

DESCRIPTION OF THE PREFERRED EMBODIMENT

With particular reference to FIG. 1 there is illustrated the end of a cryogenic delivery line having secured thereto a connector C designed for attachment to a cryogenic supply flask. The end of the connector is threaded and engages the internally threaded portion of a stainless steel coupling member 10 having a tubular portion 12. The fluid delivery tip 14 which is an integral part of connector C extends axially within, but spaced from, the tubular portion 12.

The cryogenic delivery line comprises an inner nylon tube 16 which receives the fluid delivery tip 14. The inner tube 16 is covered with a wrapped wool insulation 18. The end of the wool wrapped delivery tube is covered with an inner spiral spring 20. As will be apparent from FIG. 1, the spiral spring extends into the tubular portion 12 of the connector together with the wool wrapped nylon inner tube 16. Forming the outer surface of the delivery line is a flexible sheath 22 which is large enough to enclose the inner spring 20 as well as the tubular portion 12 of the connector. Throughout most of its length, therefore, the outer sheath is larger than the wool wrapped nylon delivery line. The sheath 22 may be a woven fiber glass tubing coated with silicone rubber, such as the Varglass material manufactured by Varflex Corporation. Finally, an outer spiral spring 24 encloses the entire assembly and helps to retain the sheath 22 to the coupling member 10. As will be noted from FIG. 1, the outer spring 24 is shorter than the inner spring 20.

The combination of the wool wrapped nylon tube and larger fiber glass sheath provide a highly flexible but well insulated delivery line. Also, and very importantly, the combination of a relatively long inner spring and a relatively shorter outer spring provides a strain relief coupling which prevents kinking of the delivery line, even under severe sideward pulls.

As an example of a specific cryogenic delivery line constructed in accordance with this invention, the tubular portion 12 was of stainless steel having an O.D. of 0.437 inch and an I.D. of 0.382 inch. The nylon tube had an O.D. of 0.187 inch. This was covered with a double wool wrap. The inner spring was 10 inches in length, had an O.D. of three-eighth inch and was formed of 0.055 inch wire. The outer spring was 4 inches in length, had an O.D. of 0.500 inch and was formed of 0.040 inch wire. A delivery line so constructed functioned well to deliver liquid nitrogen from a flask to a cryosurgical instrument while retaining flexibility, non-crimping characteristics, and other advantages set forth above.

It will be apparent to those skilled in the art that a number of variations and modifications may be made in this invention without departing from its spirit and scope. Accordingly, the foregoing description is to be construed as illustrative only rather than limiting. This invention is limited only by the scope of the following claims.

We claim:

1. A cryogenic delivery line having a tubular metal connector secured to one end thereof comprising: a plastic tube connectable to a source of cryogenic fluid; a flexible insulating material covering said tube; a spiral first spring encircling said tube and insulating material and extending from said end for a first distance therealong, all of said tube, insulating material, and first spring being contained at said end within said tubular metal connector; a flexible tubular sheath enclosing said insulated plastic tube, first spring, and tubular metal connector; and a spiral second spring encircling said sheath and connector and extending from said end for a second distance along said sheath, said first and second distances being unequal.

2. The line of claim 1 wherein said second distance is shorter than said first distance.

3. The line of claim 1 wherein said plastic tube is nylon.

4. The line of claim 1 wherein said insulating material is wool.

5. The line of claim 1 wherein said sheath is a woven fiber glass tube.

6. The line of claim 5 wherein said sheath is coated with silicone rubber.

7. The line of claim 2 wherein said plastic tube is nylon.

8. The line of claim 7 wherein said sheath is a woven fiber glass tube.

9. The line of claim 8 wherein said sheath is coated with silicone rubber.

10. The line of claim 9 wherein said insulating material is wool.

* * * * *